Patented Sept. 10, 1935

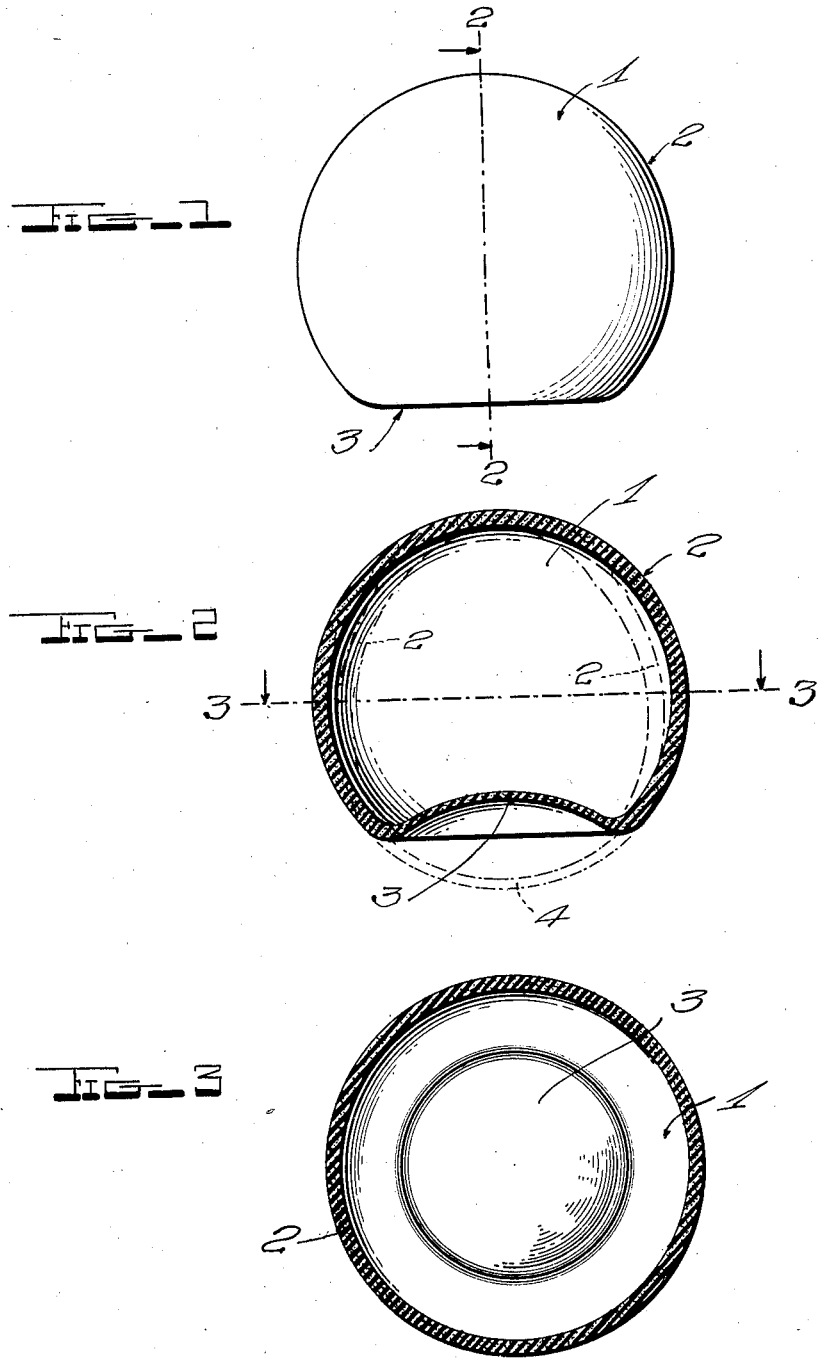

2,014,022

UNITED STATES PATENT OFFICE 2,014,022

MASSAGING DEVICE

David H. Klein, Memphis, Tenn.

Application January 28, 1935, Serial No. 3,824

5 Claims. (Cl. 128—67)

My invention relates to a massaging device and has particularly in view, one that will create a strong uniform suction on the skin to stimulate and clean the pores and bring the capillaries closer to the surface of the skin.

A further object is to provide a massager that can be easily manipulated and which fits in the palm of the hand and holds its shape.

Referring to the drawing for a more complete disclosure of the invention,

Fig. 1 is a side elevation,

Fig. 2 is a section on the line 2—2 of Fig. 1, and

Fig. 3 is a section on the line 3—3 of Fig. 2.

The massager, which is shown full size in the drawing, is made like the ordinary rubber hand ball, from soft rubber and has a spherical portion 1, the wall 2 of which is about 3/8 of an inch thick and a concave portion 3, the walls of which are about 1/8 of an inch thick. The ball is made of one piece and as much air as practicable is evacuated therefrom so that the pressure inside the ball is substantially below atmospheric pressure and sufficient in any event to cause the thin part 3 of the wall to be pressed inwards into the concave shape as shown.

In using the massager, the operator holds it in the palm of his hand and squeezes it so that the thin concave portion 3 bulges outwardly to form a convex spherical surface, as at 4, and then places this portion against the wet or greased skin of the patient. On releasing the hand pressure on the ball, the portion 3 will again assume its concave position, creating a suction on the portion of the skin covered thereby. The ball will be normally held to the surface of the skin by sufficient suction so that it can be moved around for a considerable time without releasing the suction. When the ball is squeezed again sufficiently, the suction is relieved and the ball released and the operation can be repeated again.

The ball can be made various sizes other than that shown and still give ample suction. With a device of this type, there is an equal suction at all parts of the skin, which are drawn up into and fill the concave portion which provides a wall support for the skin at all points. In this way, no red marks or rings are left on the skin which may happen if there is unequal suction on the different parts of the skin.

I claim:

1. A massaging device made of an air tight self-sustaining soft rubber ball having a portion of its surface concaved to provide a massaging surface, whereby when pressure is applied to the spherical part of the ball the concave portion will be converted into a convex surface and on release of the pressure will resume its concave shape and thereby act as a suction cup.

2. A massaging device made of an air tight self-sustaining soft rubber ball having a spherical surface and a concave massaging surface, the wall forming the concave surface being thinner than the wall forming the spherical surface.

3. A massaging device made of an air tight self-sustaining soft rubber ball having a spherical surface and a concave massaging surface, the wall forming the concave surface being thinner than the wall forming the spherical surface, the pressure in the ball being less than atmospheric.

4. A massaging device made of an air tight self-sustaining soft rubber ball having a spherical surface and a concave massaging surface, the pressure in the ball being less than atmospheric.

5. A massaging device made of an air tight self-sustaining soft rubber receptacle, the pressure in the receptacle being less than atmospheric, and having a normally concave portion to provide a massaging surface, whereby when pressure is applied to the main portion of the receptacle, the concave portion will be converted into a convex surface and on release of the pressure will resume its concave shape, and thereby act as a suction cup.

DAVID H. KLEIN.